UNITED STATES PATENT OFFICE.

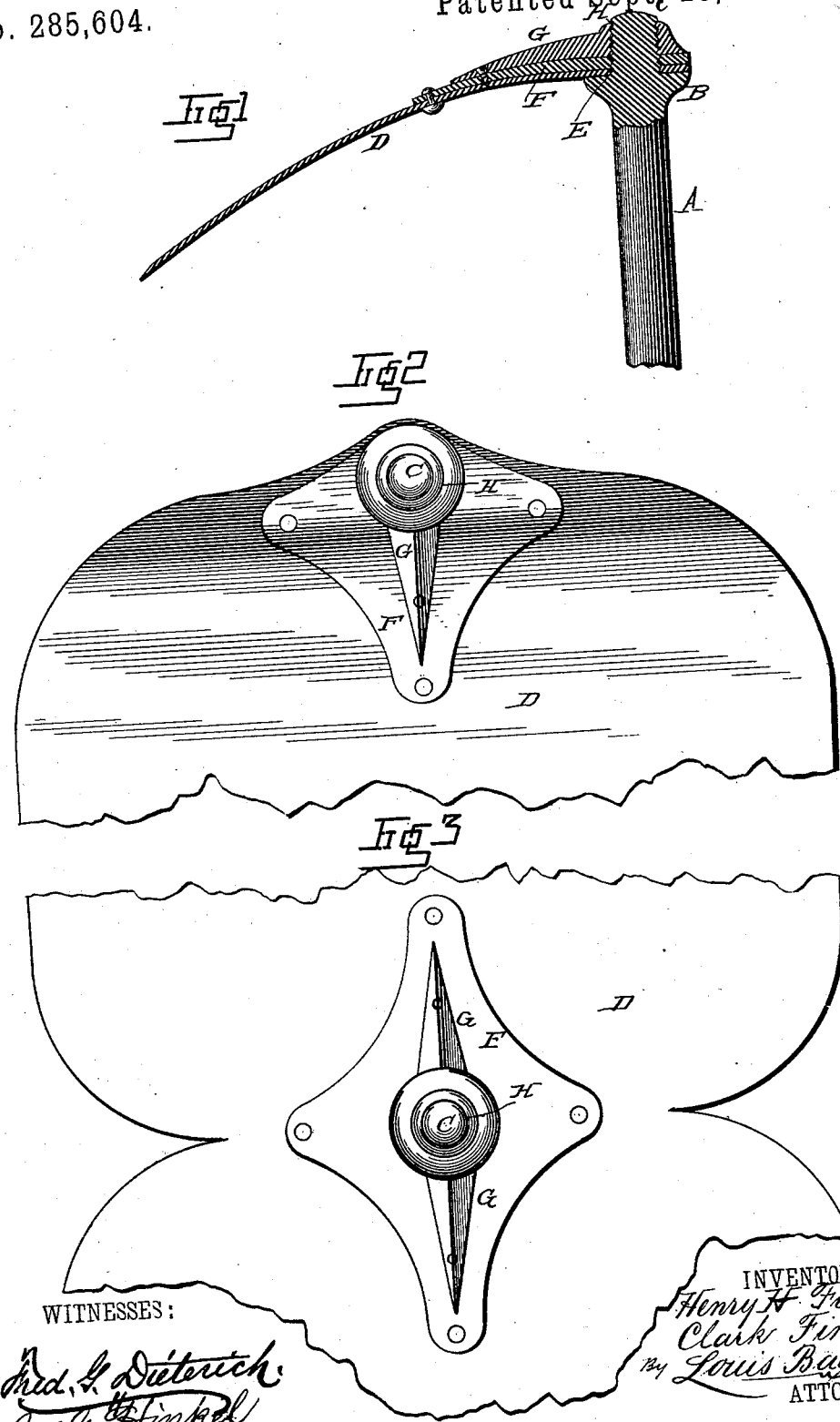

HENRY H. FINN AND CLARK FINN, OF ELKDALE, PENNSYLVANIA.

HOE.

SPECIFICATION forming part of Letters Patent No. 285,604, dated September 25, 1883.

Application filed March 3, 1883. (No model.)

*To all whom it may concern:*

Be it known that we, HENRY H. FINN and CLARK FINN, of Elkdale, in the county of Susquehanna and State of Pennsylvania, have invented certain new and useful Improvements in Garden and Farm Hoes; and we do hereby declare that the following is a full, clear, and exact description of the invention, which will enable others skilled in the art to which it appertains to make and use the same, reference being had to the accompanying drawings, which form a part of this specification, and in which—

Figure 1 is a vertical sectional view of our improved hoe. Fig. 2 is a side view of the hoe-blade, and Fig. 3 is a similar view of a slight modification of the same.

Similar letters of reference indicate corresponding parts in all the figures.

Our invention has relation to that class of garden and farm hoes in which the blade is re-enforced by a winged plate, forming the socket for the insertion of the handle; and it consists in the improved construction and combination of parts of such a hoe in which the winged re-enforcing plate forms a screw-threaded socket for the insertion of the straight screw-threaded shank of the handle, and in which the blade is curved, and the socket and the perforation in the blade, through which the shank of the handle passes, is within the upper edge of the blade, thus making a very strong and effective hoe, as hereinafter more fully described and claimed.

In the accompanying drawings, the letter A indicates the shank of the hoe, which is fastened upon the end of the handle, and is straight, forming a flange or collar, B, near its outer end, C, which projects from the middle of the collar, and is cut screw-threaded.

D is the hoe-blade, which is bent or curved inward toward the handle, and the upper portion of which has a perforation, E, through which the screw-threaded end of the shank passes.

A plate, F, forming wings to the sides and toward the edge, is fastened upon the upper portion of the blade, and forms a re-enforcing rib, G, extending toward the edge, and a screw-threaded socket, H, into which the end of the shank is screwed, securing the blade to the shank.

If desired, the blade may be made, as shown in Fig. 3, extending to both sides from the socket, when the plate F and the re-enforcing rib are extended to both sides of the socket.

It will be seen that by this construction of the blade, a new blade may be fastened upon the same shank and handle when the former blade is worn out, thus saving the cost of a new shank and handle; and that by making the upper portion of the blade extending above the end of the handle, and strengthening it by plate F and re-enforcing rib G, a strong and substantial hoe is provided.

By curving the blade instead of the shank, the advantage is obtained, that in hoeing the dirt will not slip over the upper edge of the hoe, but be more thoroughly worked by being turned, in striking the upper portion of the blade, and thus be easier pulverized.

We are aware that hoes have been made with re-enforcing plates upon the back, which form sockets for the reception of the handle; and likewise we are aware that it is not broadly new to attach the screw-threaded end of a handle into a female-threaded socket in the object to be secured to the handle; and we do not claim such construction, broadly; but,

What we claim, and desire to secure by Letters Patent of the United States, is—

The herein-described hoe, consisting of the curved blade having the perforation near its upper edge, the winged plate secured upon the upper portion of the back of the blade, forming the re-enforcing rib, and the female-threaded socket for the reception of the shank of the handle, corresponding to the perforation in the blade, and the detachable handle having screw-threaded outer end, adapted to pass through the perforation in the blade, and to be secured in the socket of the winged plate, and the flange inside the screw-threaded end adapted to bear against the inner side of the blade, all constructed and combined as and for the purpose shown and set forth.

In testimony that we claim the foregoing as our own we have hereunto affixed our signatures in presence of two witnesses.

HENRY H. FINN.
CLARK FINN.

Witnesses:
JAS. W. LOWRY,
LO. SKINNER.